Feb. 12, 1935.  O. J. STEINWAND  1,991,033
DICING MACHINE
Filed Dec. 20, 1933  2 Sheets-Sheet 1
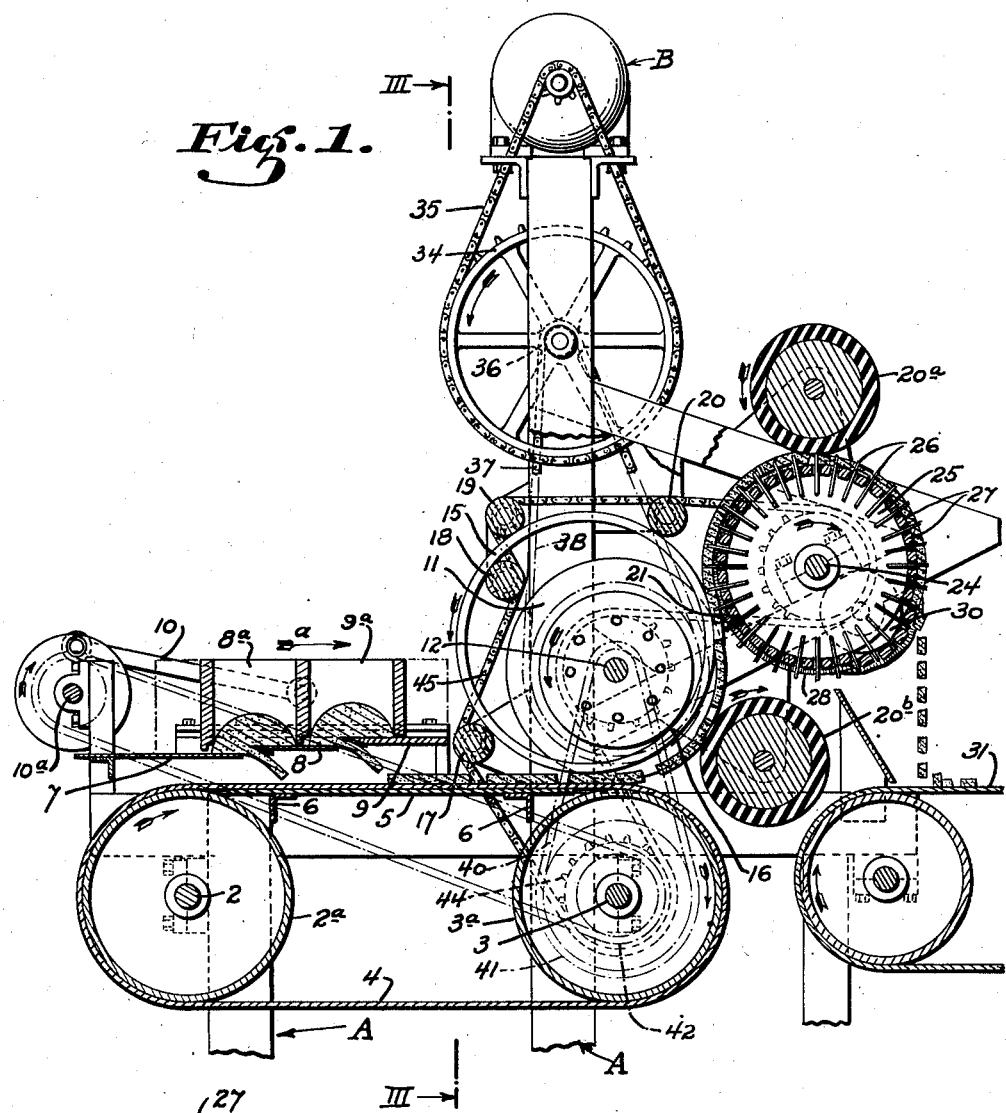
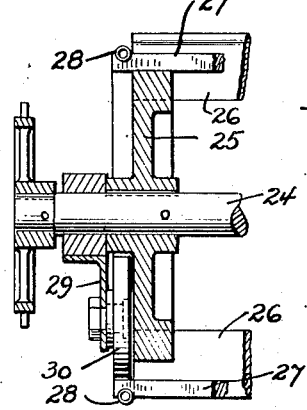
INVENTOR.
Otto J. Steinwand.
BY Townsend & Loftus.
ATTORNEYS.

Feb. 12, 1935. O. J. STEINWAND 1,991,033
DICING MACHINE
Filed Dec. 20, 1933 2 Sheets-Sheet 2

INVENTOR.
Otto J. Steinwand.
BY
Townsend and Loftus.
ATTORNEYS.

Patented Feb. 12, 1935

1,991,033

UNITED STATES PATENT OFFICE 1,991,033

DICING MACHINE

Otto J. Steinwand, San Francisco, Calif.

Application December 20, 1933, Serial No. 703,168

7 Claims. (Cl. 146—78)

This invention relates to a machine for dicing fruit, vegetables, and like materials.

The object of the present invention is to generally improve and simplify the construction and operation of dicing machines; to provide a dicing machine which is especially designed to handle sliced fruit, orange or lemon peel, and like material; to provide a dicing machine which is capable of dicing comparatively thin or flat sliced material without crushing or otherwise damaging the same, first by cutting the material into longitudinal strips, and secondly by cross-cutting the strips to form a final diced product in the shape of small square, rectangular, or the like; to provide means for automatically slicing material to be diced and for feeding the sliced material to the knives whereby the cutting or dicing is performed; to provide means for automatically ejecting material from between the knives; and, further, to provide a dicing machine which is continuous in operation, positive in action, and capable of turning out a uniform product.

The dicing machine is shown by way of illustration in the accompanying drawings, in which—

Fig. 1 is a side elevation in section showing the dicing machine.

Fig. 2 is an enlarged detail longitudinal sectional view of one end of the drum which carries the cross-cutting knives.

Figure 3:
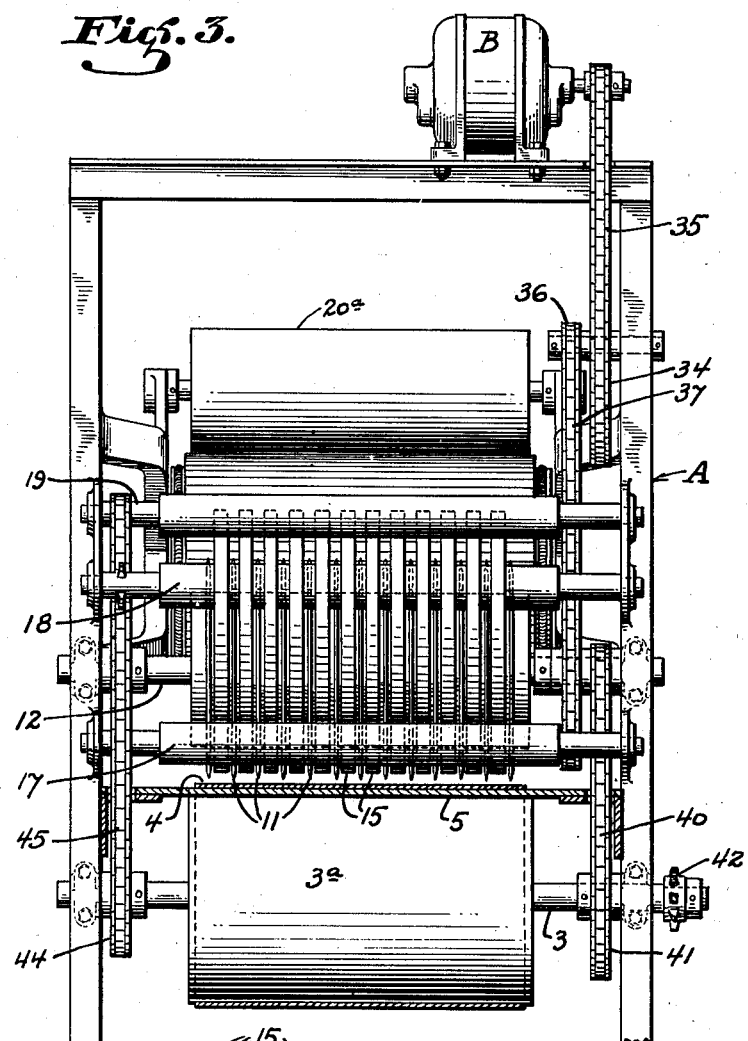
Fig. 3 is an end view in section taken on line III—III of Fig. 1.

Referring to the drawings in detail, and particularly Figs. 1 and 3, A indicates a frame on which is journaled a pair of cross shafts 2 and 3. Secured on the cross shaft 2 is a pulley 2a and suitably secured on the shaft 3 is a pulley 3a, said pulleys supporting an endless belt 4 which functions as a feed belt as will hereinafter be described. Disposed below the upper run of the feed belt is a table or platform 5 which is supported by cross bars 6. This table supports the feed belt and maintains it horizontally, thereby preventing sagging when material to be cut or diced is delivered thereto.

The machine is particularly intended for handling flat material, such as fruit, vegetables, or the like, which have been sliced into thin slices or it might be such thin material as is obtained when employing orange or lemon peel, or the like. In the present instance a table is shown which is arranged in three steps, as indicated at 7, 8 and 9. The forward edges of the tables 8 and 9 form cutting edges and slidable over these edges is a casing which is divided into two compartments 8a and 9a. Material, such as fruit or the like, to be cut is placed in each compartment. A reciprocating movement is transmitted to the casing through the crank arm and connecting rod 10, hence during each forward stroke in the direction of arrow $a$ $a$ a pair of slices will be cut and placed on the belt one forward of the other. During the return stroke no cut is made but during that stroke the two cut slices are advanced, hence during the next forward stroke two slices will again be delivered and the belt is thus kept full.

Figure 4:
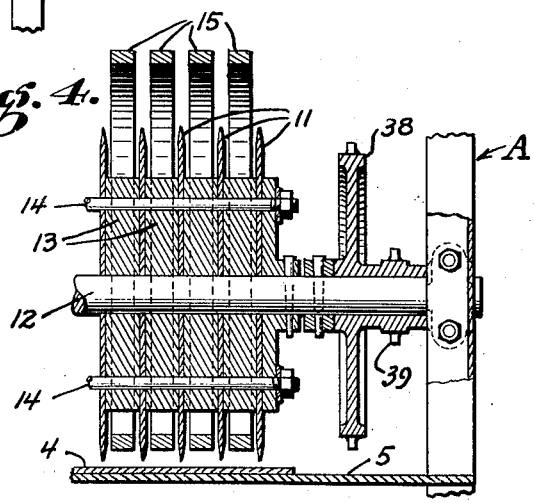
Fig. 4 is an enlarged detail longitudinal sectional view of the drum carrying the circular knives.

The thin material, whether it be orange or lemon peel, sliced fruit, vegetables, or the like, is in the present instance first cut into longitudinal strips and these strips are then cross-cut so as to produce a diced product having a square or rectangular shape. In order to cut the flat material into longitudinal strips a plurality of circular knives, see Figs. 1 and 4 are employed. These knives are indicated at 11. They are carried by a shaft 12 journaled crosswise of the frame, and they are spaced apart by spacing blocks 13. Bolts 14 extend through the blocks and the circular knives and a rigid drum-like structure is secured. Also, disposed between the circular blades or knives are rings 15. These rings are held against the spacing blocks 13 at the point indicated at 16 and they are otherwise supported by idlers or rollers, such as indicated at 17, 18, 19 and 20. The rings form a number of functions, first it will be noted that as the sliced material is fed forwardly by the belt 4 that this material is engaged by the circular knives and also by the lower portion of the rings 15. The rings, accordingly, function to engage the flat sliced material and to assist the feed belt in delivering the flat sliced material to the circular knives. The knives are in substantial engagement with the upper surface of the feed belt but do not exactly contact the same. The material is, however, cut and most of the material is forced in the radial inward direction between the circular knives and the material is thus cut into strips and the strips are frictionally held between the knives being completely cut and forced still further inwardly between the knives when engaging a rubber roller 20. At the point, indicated at 21, the rings form another function, to-wit, that of ejecting the material from between the circular knives and at the same time forcing it into engagement with a series of cross-cutting blades carried by a shaft generally indicated at 24.

This shaft, see Figs. 1 and 2, carries a drum head 25 at each end. The drum head is radially slotted and a plurality of longitudinally disposed cutting blades 26 are mounted in the slotted drum heads and there secured. These knives function to cross-cut the strips cut by the circular knives and means must accordingly be provided for ejecting the material from between the knives. The ejector bars 27 are provided for this purpose. The ends project beyond the drum heads 25 and the ends are supported by a helical coil spring 28. Secured to the main frame are a pair of bracket arms 29 and journaled in the outer end thereof are rollers 30. These rollers engage the ends of the ejector bars 27 once during each revolution as the shaft 24 and drum head 25 rotate. The bars 27 are thus forced outwardly and any cut material disposed between the cross-cutting blades 26 will thus be ejected and will be discharged on the conveyor or any other suitable means indicated at 31. The rings 15, as previously stated, force the cut strips from between the circular knives against the cross-cutting knives. The material that remains between these knives is forced further inwardly by a roller 20a similar to the roller 20b and the cut material stays between these knives until the ejecting bars engage the rollers 30. At this point the material is ejected and the conveyor belt 31 will carry the material away.

To drive the several shafts and drums carried thereby directly from an electric motor as here shown a considerable speed reduction is required. In this drive B indicates the electric motor. This motor drives a sprocket gear of fairly large diameter, such as indicated at 34, through means of a chain 35. Formed integral with the hub of this sprocket gear 34 is a small sprocket pinion 36. This drives through a chain 37 to a large sprocket gear 38 free on shaft 12. Sprocket 38 carries a small sprocket gear 39 and this drives through a chain 40 to a sprocket gear 41 secured on shaft 3. Shaft 3, when driven, drives shaft 2 and belt 4. Another sprocket on this shaft, and indicated at 42, drives a crank shaft 10a and a third sprocket secured on the same shaft, and indicated at 44, drives through a chain 45 not only the shaft 24 and the drum carrying the cross-cutting knives but it also drives shaft 12 and the several rollers 17, 18, 19 and 20. These rollers perform two functions, to-wit, that of supporting the rings 15, and also rotating the same at the same speed as the circular knives.

A machine of this character, as previously stated, is particularly intended for handling flat material. Much of the flat material handled will not stand much pressure or handling as such pressure will tend to crush it and drive out the juice. In the present instance comparatively soft pulpy materials may be handled as the material is first cut into strips. This operation requires comparatively little, if any, pressure and after it has been cut into strips it is forced against the cross-cutting blades and then ejected. In other words the cutting operations take place in successive steps. If all sides were cut at one time, considerable pressure would be required and crushing and loss of juice would result. The successive cutting operations eliminate such crushing action and, furthermore, produce cleaner cuts and less waste. The operation is continuous, machine capacity can be obtained, and as the machine is exceedingly simple and substantial both in construction and operation the work can be performed without interruption and a uniform product is assured.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a machine of the character described a plurality of spaced circular knives, means for rotating the knives, a feed belt for delivering flat material to the knives and for forcing the material as it is being cut in the form of strips into the spaces between the knives where the material is frictionally held, and rings disposed between the circular knives and positioned in a fixed eccentric position with relation to the same, said rings functioning at one point to engage material to be cut and to assist the feed belt to deliver the material to the knives and said rings functioning at another point to eject the cut material which is frictionally held between the knives.

2. In a machine of the character described a plurality of spaced circular knives, means for rotating the knives, a feed belt for delivering flat material to the knives and for forcing the material as it is being cut in the form of strips into the spaces between the knives where the material is frictionally held, rings disposed between the circular knives and positioned in a fixed eccentric position with relation to the same, said rings functioning at one point to engage material to be cut and to assist the feed belt to deliver the material to the knives and said rings functioning at another point to eject the cut material which is frictionally held between the knives, and means for rotating the rings at the same speed as the circular knives.

3. In a machine of the character described, a plurality of spaced circular knives, means for rotating the knives, a feed belt for delivering flat material to the knives and for forcing the material as it is being cut in the form of strips into the spaces between the knives where the material is frictionally held, rings disposed between the circular knives and being larger in diameter than the knives, and means supporting the rings in a fixed eccentric position with relation to the knives where the rings will intersect the circular cutting edges of the knives at two points, said rings functioning at one of said points to engage the material to be cut and to assist the feed belt to deliver the material to the knives and said rings functioning at the other point to eject the cut material which is frictionally held between the knives.

4. In a machine of the character described, a plurality of spaced circular knives, means for rotating the knives, a feed belt for delivering flat material to the knives and for forcing the material as it is being cut in the form of strips into the spaces between the knives where the material is frictionally held, rings disposed between the circular knives and being larger in diameter than the knives, means supporting the rings in a fixed eccentric position with relation to the knives where the rings will intersect the circular cutting edges of the knives at two points, said rings functioning at one of said points to engage the material to be cut and to assist the feed belt to deliver the material to the knives and said rings functioning at the other point to eject the cut material which is frictionally held between the knives, and means for rotating the rings at the same speed as the circular knives.

5. In a machine of the character described, a plurality of spaced circular knives, means for rotating the knives, a feed belt for delivering flat material to the knives and for forcing the material as it is being cut in the form of strips into the spaces between the knives where the material is frictionally held, a cylinder having a plurality of cross cutting knives mounted thereon and positioned close to the cutting edges of the circular knives, rings disposed between the circular knives and being larger in diameter than the knives, and means supporting the rings in a fixed eccentric position with relation to the knives where the rings will intersect the circular cutting edges of the knives at two points, said rings functioning at one of said points to engage material to be cut and to assist the feed belt to deliver the material to the circular knives, said rings functioning at the other point to eject the cut material and to simultaneously force the cut material against and between the blades of the cross cutting knives.

6. In a machine of the character described, a plurality of spaced circular knives, means for rotating the knives, a feed belt for delivering flat material to the knives and for forcing the material as it is being cut in the form of strips into the spaces between the knives where the material is frictionally held, a cylinder having a plurality of cross cutting knives mounted thereon and positioned close to the cutting edges of the circular knives, rings disposed between the circular knives and being larger in diameter than the knives, means supporting the rings in a fixed eccentric position with relation to the knives where the rings will intersect the circular cutting edges of the knives at two points, said rings functioning at one of said points to engage material to be cut and to assist the feed belt to deliver the material to the circular knives, said rings functioning at the other point to eject the cut material and to simultaneously force the cut material against and between the blades of the cross cutting knives, means for positively rotating the rings at the same speed as the circular knives, and means for automatically ejecting the material cut by the cross cutting knives.

7. In a machine of the character described, a plurality of spaced circular knives, means for rotating the knives, a feed belt for delivering flat material to the knives and for forcing the material as it is being cut in the form of strips into the spaces between the knives where the material is frictionally held, a cylinder having a plurality of cross cutting knives mounted thereon and positioned close to the cutting edges of the circular knives, rings disposed between the circular knives and being larger in diameter than the knives, means supporting the rings in a fixed eccentric position with relation to the knives where the rings will intersect the circular cutting edges of the knives at two points, said rings functioning at one of said points to engage material to be cut and to assist the feed belt to deliver the material to the circular knives, said rings functioning at the other point to eject the cut material and to simultaneously force the cut material against and between the blades of the cross cutting knives, means for positively rotating the rings at the same speed as the circular knives, ejector bars disposed between the cross cutting knives, said knives having a pair of projections one at each end thereof, and a pair of stationary rollers disposed one at each end of the ejector bars and engageable with the projections on the ejector bars to eject the material cut by the cross cutting knives.

OTTO J. STEINWAND.